(12) United States Patent
Gowravaram et al.

(10) Patent No.: US 9,727,501 B2
(45) Date of Patent: Aug. 8, 2017

(54) SAN FABRIC ONLINE PATH DIAGNOSTICS

(75) Inventors: Krishnakumar Gowravaram, Cupertino, CA (US); Ramkumar Vadivelu, San Jose, CA (US); Varghese Kallarackal, Sunnyvale, CA (US); Vinodh Ravindran, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1161 days.

(21) Appl. No.: 13/285,833

(22) Filed: Oct. 31, 2011

(65) Prior Publication Data

US 2013/0111077 A1 May 2, 2013

(51) Int. Cl.
*G06F 13/28* (2006.01)

(52) U.S. Cl.
CPC .................. *G06F 13/28* (2013.01)

(58) Field of Classification Search
None
See application file for complete search history.

(56) References Cited

U.S. PATENT DOCUMENTS

| | | | |
|---|---|---|---|
| 6,798,742 B1* | 9/2004 | Mawhinney et al. | 370/230 |
| 7,230,917 B1* | 6/2007 | Fedorkow et al. | 370/229 |
| 7,243,229 B2* | 7/2007 | Maki et al. | 713/164 |
| 7,403,542 B1* | 7/2008 | Thompson | 370/474 |
| 7,742,484 B2* | 6/2010 | Makishima et al. | 370/400 |
| 7,853,951 B2* | 12/2010 | Rosenbluth et al. | 718/104 |
| 2002/0156612 A1* | 10/2002 | Schulter et al. | 703/23 |
| 2003/0126322 A1* | 7/2003 | Micalizzi et al. | 710/52 |
| 2003/0231593 A1* | 12/2003 | Bauman et al. | 370/235 |
| 2004/0062267 A1* | 4/2004 | Minami et al. | 370/463 |
| 2006/0013222 A1* | 1/2006 | Rangan et al. | 370/389 |
| 2006/0221832 A1* | 10/2006 | Muller et al. | 370/235 |
| 2008/0275989 A1* | 11/2008 | Ebersole et al. | 709/225 |
| 2010/0153617 A1* | 6/2010 | Miroshnichenko et al. | 711/6 |
| 2011/0153950 A1* | 6/2011 | Ishizaka et al. | 711/133 |
| 2012/0051738 A1 | 3/2012 | Skirmont et al. | |
| 2013/0117621 A1* | 5/2013 | Saraiya et al. | 714/748 |
| 2013/0138836 A1* | 5/2013 | Cohen et al. | 709/250 |

OTHER PUBLICATIONS

Brocade Communications Systems, Incorporated; "Fabric OS" Command Reference Manual, Supporting Fabric OS 6.1.0, #53-1000599-02; Mar. 12, 2008, pp. i-xxvi, 1-14.
Brocade Communications Systems, Incorporated; "Fabric OS" Command Reference Manual, Supporting Fabric OS 6.1.0, #53-1000599-02; Mar. 12, 2008, pp. 15-54.

(Continued)

*Primary Examiner* — Henry Tsai
*Assistant Examiner* — Christopher Bartels
(74) *Attorney, Agent, or Firm* — Blank Rome, LLP

(57) ABSTRACT

A diagnostic testing utility is used to perform online path diagnostic tests to troubleshoot components in a path that contribute to performance degradations and check application level data integrity, while traffic is allowed to flow as normal. To perform the diagnostic tests, two HBA or CNA ports at each end of a path are identified and used to send test frames to perform the diagnostic tests. The entire diagnostic procedure is performed without taking any ports or servers offline.

28 Claims, 6 Drawing Sheets

(56) References Cited

OTHER PUBLICATIONS

Brocade Communications Systems, Incorporated; "Fabric OS" Command Reference Manual, Supporting Fabric OS 6.1.0, #53-1000599-02; Mar. 12, 2008, pp. 55-94.
Brocade Communications Systems, Incorporated; "Fabric OS" Command Reference Manual, Supporting Fabric OS 6.1.0, #53-1000599-02; Mar. 12, 2008, pp. 95-134.
Brocade Communications Systems, Incorporated; "Fabric OS" Command Reference Manual, Supporting Fabric OS 6.1.0, #53-1000599-02; Mar. 12, 2008, pp. 135-174.
Brocade Communications Systems, Incorporated; "Fabric OS" Command Reference Manual, Supporting Fabric OS 6.1.0, #53-1000599-02; Mar. 12, 2008, pp. 175-214.
Brocade Communications Systems, Incorporated; "Fabric OS" Command Reference Manual, Supporting Fabric OS 6.1.0, #53-1000599-02; Mar. 12, 2008, pp. 215-254.
Brocade Communications Systems, Incorporated; "Fabric OS" Command Reference Manual, Supporting Fabric OS 6.1.0, #53-1000599-02; Mar. 12, 2008, pp. 255-294.
Brocade Communications Systems, Incorporated; "Fabric OS" Command Reference Manual, Supporting Fabric OS 6.1.0, #53-1000599-02; Mar. 12, 2008, pp. 295-334.
Brocade Communications Systems, Incorporated; "Fabric OS" Command Reference Manual, Supporting Fabric OS 6.1.0, #53-1000599-02; Mar. 12, 2008, pp. 335-374.
Brocade Communications Systems, Incorporated; "Fabric OS" Command Reference Manual, Supporting Fabric OS 6.1.0, #53-1000599-02; Mar. 12, 2008, pp. 375-414.
Brocade Communications Systems, Incorporated; "Fabric OS" Command Reference Manual, Supporting Fabric OS 6.1.0, #53-1000599-02; Mar. 12, 2008, pp. 415-454.
Brocade Communications Systems, Incorporated; "Fabric OS" Command Reference Manual, Supporting Fabric OS 6.1.0, #53-1000599-02; Mar. 12, 2008, pp. 455-494.
Brocade Communications Systems, Incorporated; "Fabric OS" Command Reference Manual, Supporting Fabric OS 6.1.0, #53-1000599-02; Mar. 12, 2008, pp. 495-534.
Brocade Communications Systems, Incorporated; "Fabric OS" Command Reference Manual, Supporting Fabric OS 6.1.0, #53-1000599-02; Mar. 12, 2008, pp. 535-574.
Brocade Communications Systems, Incorporated; "Fabric OS" Command Reference Manual, Supporting Fabric OS 6.1.0, #53-1000599-02; Mar. 12, 2008, pp. 575-614.
Brocade Communications Systems, Incorporated; "Fabric OS" Command Reference Manual, Supporting Fabric OS 6.1.0, #53-1000599-02; Mar. 12, 2008, pp. 615-654.
Brocade Communications Systems, Incorporated; "Fabric OS" Command Reference Manual, Supporting Fabric OS 6.1.0, #53-1000599-02; Mar. 12, 2008, pp. 655-694.
Brocade Communications Systems, Incorporated; "Fabric OS" Command Reference Manual, Supporting Fabric OS 6.1.0, #53-1000599-02; Mar. 12, 2008, pp. 695-734.
Brocade Communications Systems, Incorporated; "Fabric OS" Command Reference Manual, Supporting Fabric OS 6.1.0, #53-1000599-02; Mar. 12, 2008, pp. 735-740.
Brocade Communication Systems, Inc.; "Fabric OS Administrator's Guide", Supporting Fabric OS v5.3.0; Publication No. 53-1000448-01; Jun. 15, 2007, pp. i-xxviii, 1-510.
Brocade Communication Systems, Inc.; "Fabric OS Command Reference Manual", Supporting Fabric OS v6.0.0; Publication No. 53-1000599-01; Oct. 19, 2007, pp. i-xxvi, 1-720.

\* cited by examiner

SAN FABRIC ONLINE PATH DIAGNOSTICS

TECHNICAL FIELD

The present invention relates to the field of computer networking, and in particular to techniques for performing online path diagnostics in a switch fabric.

BACKGROUND

Storage area networks (SANs) are typically implemented to interconnect data storage devices and servers or hosts, using network switches to provide interconnectivity across the SAN. SANs may be complex systems with many interconnected computers, switches, and storage devices. The switches are typically configured into a switch fabric, and the hosts and storage devices are connected to the switch fabric through ports of the network switches that comprise the switch fabric. Most commonly, Fibre Channel (FC) protocols are used for data communication across the switch fabric, as well as for the setup and teardown of connections to and across the fabric, although these protocols may be implemented on top of Ethernet networks.

Many SANs rely on the FC protocol. The FC protocol defines standard media and signaling conventions for transporting data in a serial fashion. It also provides an error correcting channel code and a frame structure for transporting the data. Many FC switches provide at least some degree of automatic configurability. For example, they may automatically sense when a new inter-switch link (ISL) becomes active, and may initiate an initialization process to discover what the link connects to. The switch may automatically determine various parameters for the link (e.g. link speed). As FC networks are created, updated, maintained and decommissioned, switches may be enabled, disabled or reconfigured, and links may be added or removed.

Over time, FC networks have become more complex, with multiple fabrics involving several switches that use inter-switch links (ISLs) connected to switch ports (E_ports) on the switches. At the same time as FC networks have become more complex; the network speeds have also increased significantly. As faster networks are implemented, media and cable tolerance become more important for avoiding degraded performance and cyclic redundancy check (CRC) errors. As larger networks are developed, diagnosis of optics and cables become more and more time consuming and intrusive. Current switches have two basic types of built-in diagnostics. First, the SFP electro-optical modules have digital diagnostics, but these only operate at the SFP component level. Second, a command line interface (CLI) tool may be provided to allow frames to be injected and circulated on a specific link, but the end result is only a good and bad indication, which does not greatly aid diagnosis. A third method of diagnosing ISL errors is to use D-ports, as discussed in U.S. patent application Ser. No. 13/047,513, the entire disclosure of which is hereby incorporated by reference. The D-port system would require that two ports be taken offline while the system performs the desired diagnostics. As such it is not useful for performing online diagnostics. Thus, troubleshooting suspected link and path errors with the existing tools is time consuming, can become a daunting task and/or requires that taking some ports offline. The use of external separate testing tools is also cumbersome and brings along separate problems not present with built-in tools.

Thus, it would be desirable to implement an efficient network diagnostic method to more efficiently troubleshoot larger networks, thereby improving the speed, efficiency, and reliability of these networks.

SUMMARY

In one embodiment, a network path level online diagnostic method is disclosed. The diagnostic method can monitor and set alerts for online diagnostics, test both ends of the connectivity to validate that a path is within budget, check application level data integrity, and saturate a fabric path with a representative SAN traffic profile to validate fabric performance without taking any ports or servers offline.

BRIEF DESCRIPTIONS OF THE DRAWINGS

DETAILED DESCRIPTIONS

Figure 1:
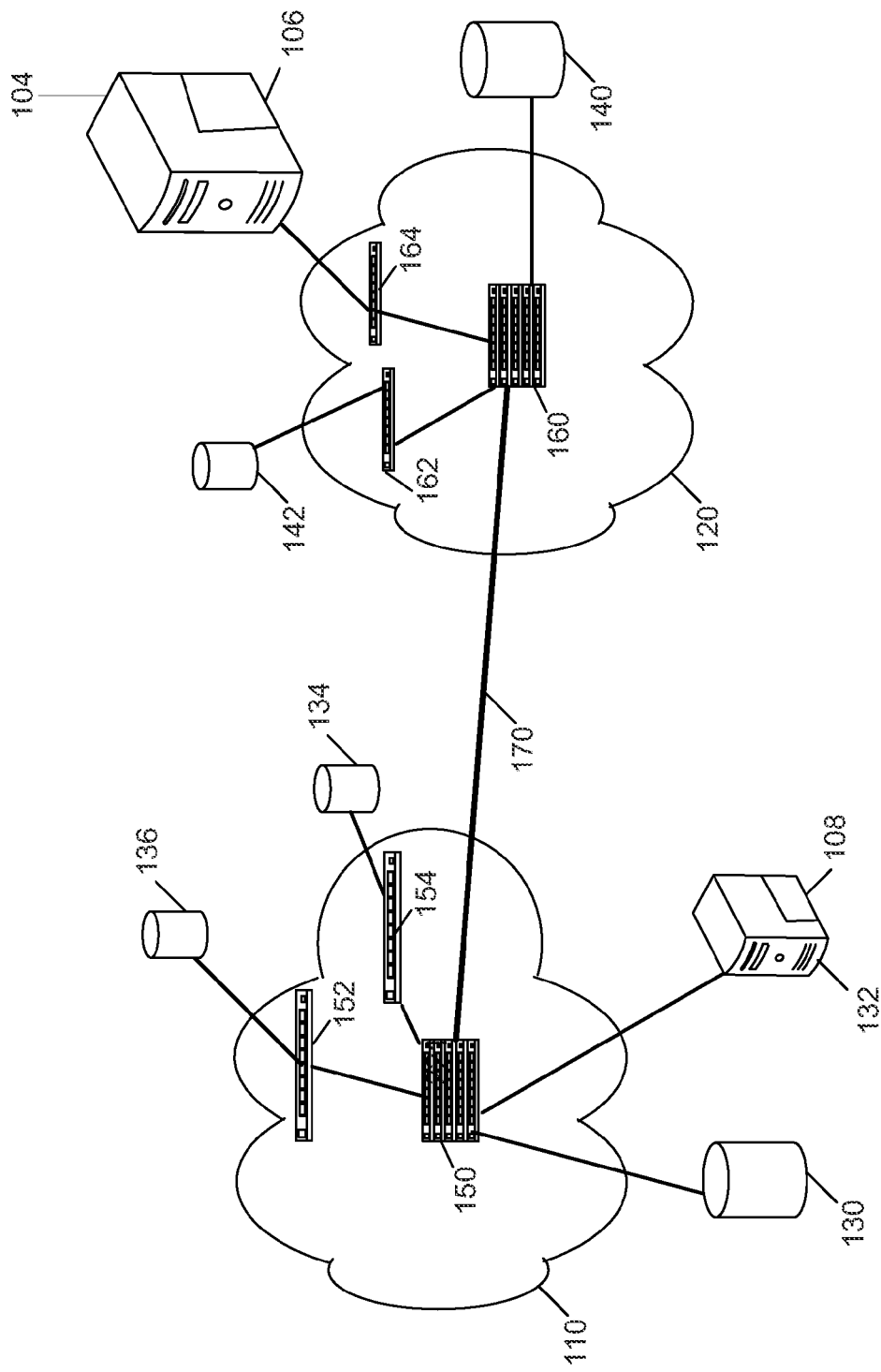
FIG. 1 is a block diagram illustrating an exemplary Fibre Channel network comprising hosts having HBA ports.

An exemplary FC network is illustrated in FIG. 1. As shown, the FC network of FIG. 1 includes two FC fabrics, a fabric 110 and a fabric 120. The fabric 120 includes switches 160, 162, 164 which are coupled to each other via ISLs and are each also connected to either a storage device or a host. For example, switch 164 is coupled to a host 104 and switch 162 is coupled to a storage device 142. The FC fabric 110 is shown as having three switches 150, 152 and 154 coupled together via ISLs. These switches are also each coupled to one or more storage devices and hosts. Switch 150 is coupled to storage device 130 and host 132, while switch 152 is coupled to a storage device 136 and switch 154 is coupled to a storage device 134. The hosts 104 and 132 may be any suitable node device such as a desktop computer, a server, or a user terminal. The switches 150 and 160 each have a router port which are connected to each other by the ISL 170. By using router ports instead of typical E_Ports, the fabrics 110 and 120 stay separate and do not merge into a single fabric.

Each of the storage devices shown in FIG. 1 may be any suitable node device including a JBOD (Just a Bunch of Disks), RAID (Redundant Array of Inexpensive Disks) array, tape library, or network data store. Each of the switches may have as few as two and as many as 256 or more ports.

The switches shown in FIG. 1, may comprise a plurality of network switches in one or more chassis. In a Fibre Channel network, hosts and devices are connected into a SAN using the switches. The numbers of storage devices and switches are illustrative and by way of example only, and any desired number of storage devices and switches may be connected in the network.

As shown in FIG. 1, hosts 104 and 132 each have, among other elements, a host bus adapter (HBA) 106 and 108, respectively. Conventionally, an HBA is a daughter or mezzanine board connected to the host. Each HBA connects its respective host to other network and storage devices on the fabrics via the FC switches. As is known in the art, each HBA has a World Wide Name (WWN), which is a unique identifier assigned to each FC device. A WWN identifies the HBA 106 or 108, and thus the respective host 104 or 132 to the Fibre Channel switches and other devices on the fabrics. The storage devices also have unique WWNs. For the switches, each device is connected to a particular port, and is identified by a port identifier (PID).

As illustrated in FIG. 1, FC networks can be complex. As such, diagnosing possible errors or faulty paths in these networks can be challenging. To more efficiently troubleshoot large networks and improve the speed, efficiency, and reliability of the networks, the inventors provide a method of diagnosing potential problems in online fabric paths using HBAs. This method enables performing diagnosis on a path in the fabric connecting two HBA ports while keeping all related ports and devices online. The method can be adapted for use in an Ethernet, FC or FCoE environment.

Figure 2A:
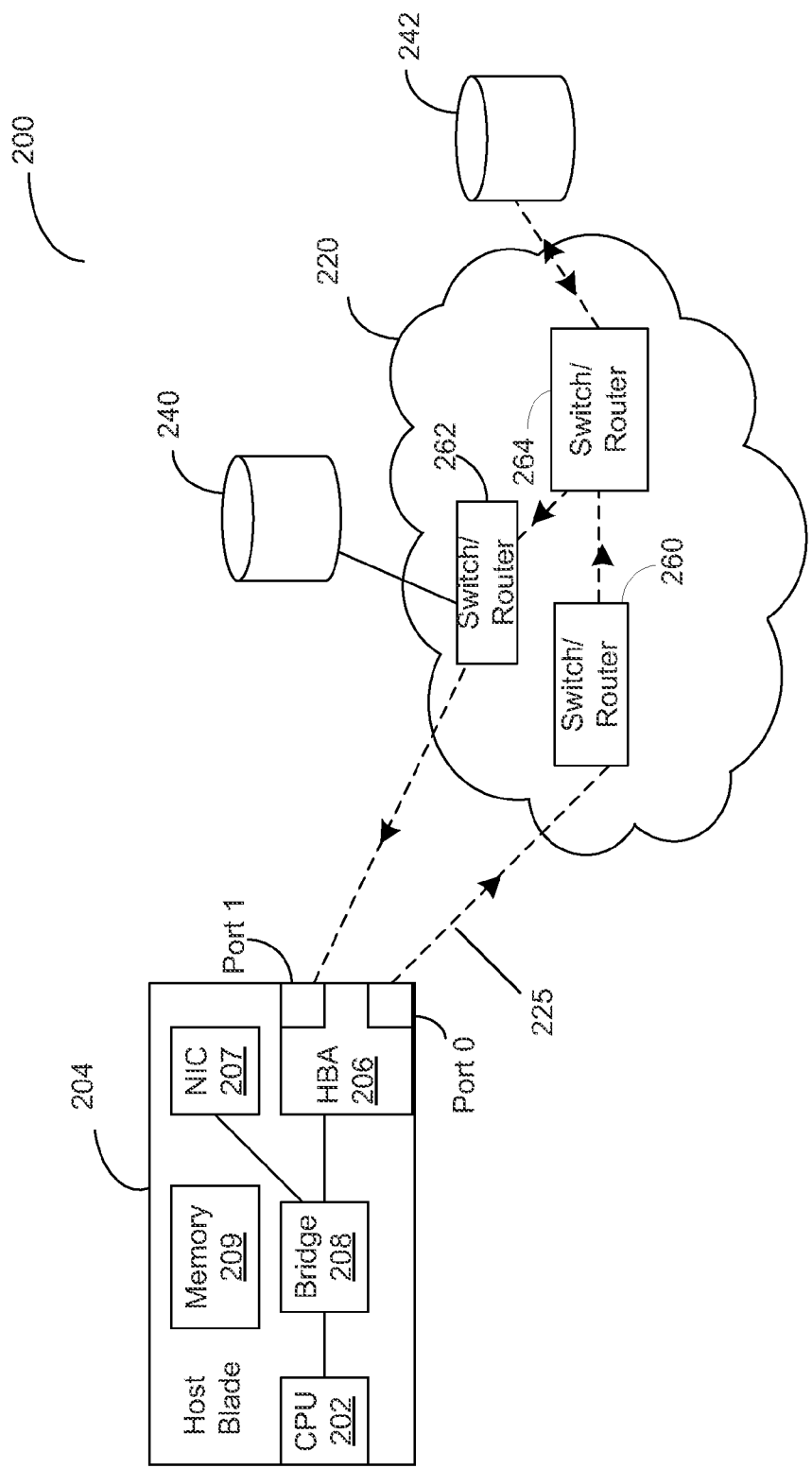
FIG. 2A is a block diagram illustrating an exemplary Fibre Chancel network implementing dual port HBA diagnostics according to one embodiment.

In a preferred embodiment, the method involves using a host having a dual port HBA, such as the HBA 206 shown in FIG. 2A. As illustrated, the host blade 204, in a blade server, includes a processor 202, a bridge 208, memory 209, an Ethernet network interface 207 and the HBA 206. Conventionally, one Ethernet interface 207 is present on the host blade 204 itself but an additional Ethernet interface 207 can be present as a daughter or mezzanine board as well. Each memory 209, connected to the bridge 208, contains queues that comprise command and completion rings for data sent to and received from the Ethernet interface 207 and/or the HBA 206. The bridge 208 handles I/O processes and provides an interface between devices internal to and external to the host blade 204 (e.g., central processing unit (CPU) 202, HBA 206). As an example, the bridge 208 can provide PCI-Express (PCI-E) connections to the HBA 206 and the Ethernet interface 207. As is known in the art, each HBA 206 has a unique World Wide Name (WWN), which identifies the HBA 206, and thus the respective host blade 204, to the FC switches and the other devices on the fabric 220. Similarly, each Ethernet interface 207 has a unique MAC address for a similar purpose.

The host blade 204 may be used in Ethernet, Fibre Channel and FCoE environments. When used in multiple fabric environments, the host blade 204 may include a converged network adapter (CNA), instead of an HBA. A CNA operates in a similar manner as an HBA, but can be used in converged enhanced Ethernet (CEE) networks and is capable of operating according to 10 G Ethernet and FCoE. An HBA is generally only capable of operating in an FC environment. The embodiments of the present invention can be adapted for both HBAs and CNAs. As used in this specification, the term HBA may be interchangeable with the term CNA.

As shown in FIG. 2A, the HBA 206 is connected to the fabric 220 at two HBA ports, port 0 and port 1. As is known in the art, connections between switches result in inter-switch links and connections between any two devices constitute a path. A path involving a host can be diagnosed in accordance with the preferred embodiment of the present invention by selecting two HBA ports with at least one of the ports residing on the host. For example, the path 225 (shown by dashed lines) involving the host 204 can be diagnosed by selecting ports 0 and 1 as the two ends of the path. The path 225 can be diagnosed to detect potential faults and/or check application level data integrity by using data located in the host memory 209.

In the embodiment illustrated in FIG. 2A, the two HBA ports define the path to be diagnosed. As shown, the path 225 travels from port 0 of HBA 206 to switch 260, switch 264, storage device 242 and then back from storage device 242 to switch 264 and through switch 262 to port 1 of the HBA 206. In other embodiments, any path connecting two different HBA ports can be diagnosed. In some embodiments, the path begins with one of the HBA ports and ends with the other. In other embodiments, the path may be bi-directional. In all of these embodiments, the method performs the diagnostic tests while allowing traffic to flow normally, without the need to take any of the ports or the devices offline.

Figure 2B:
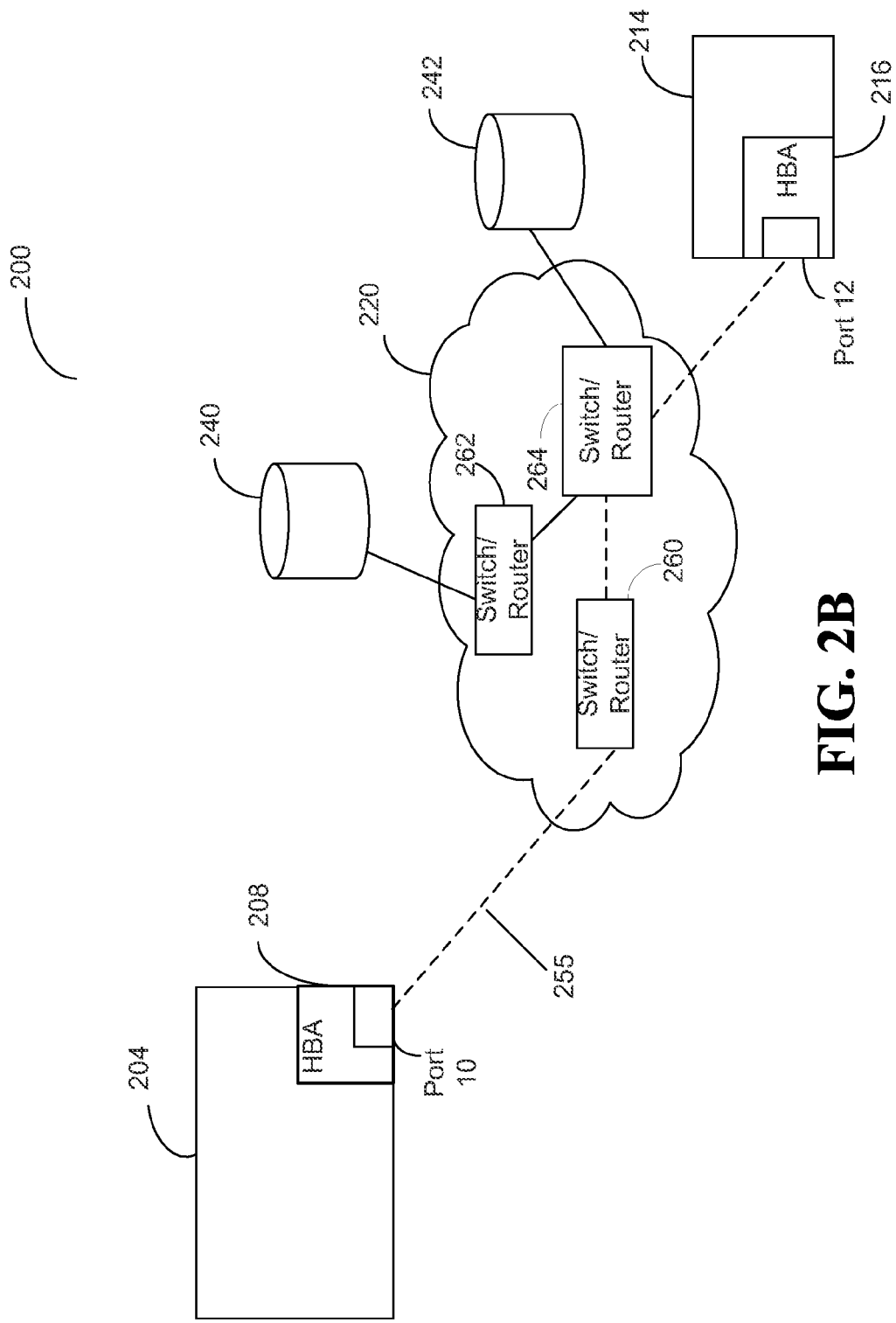
FIG. 2B is a block diagram illustrating an exemplary Fibre Chancel network implementing single port HBA diagnostics according to one embodiment.

An alternative to using dual port HBAs is illustrated in FIG. 2B. As shown, the diagnostic method of the present invention can also be achieved through the use of two or more single port HBAs or the use of only one port in dual port HBAs. In the embodiment shown in FIG. 2B, the path to be diagnosed extends from a port 10 of the HBA 208 to port 12 of the HBA 216. The path is generally bi-directional, but can also consist of one direction only.

To diagnose possible faults in either path 225 or 255, the HBA ports will source and sink bi-directional traffic at an optimized line rate. In the preferred embodiment, the line rate is 16 G for FC and 10 G for FCoE, as these are the maximum speeds in each protocol of the preferred HBA or CNA.

Figure 3:
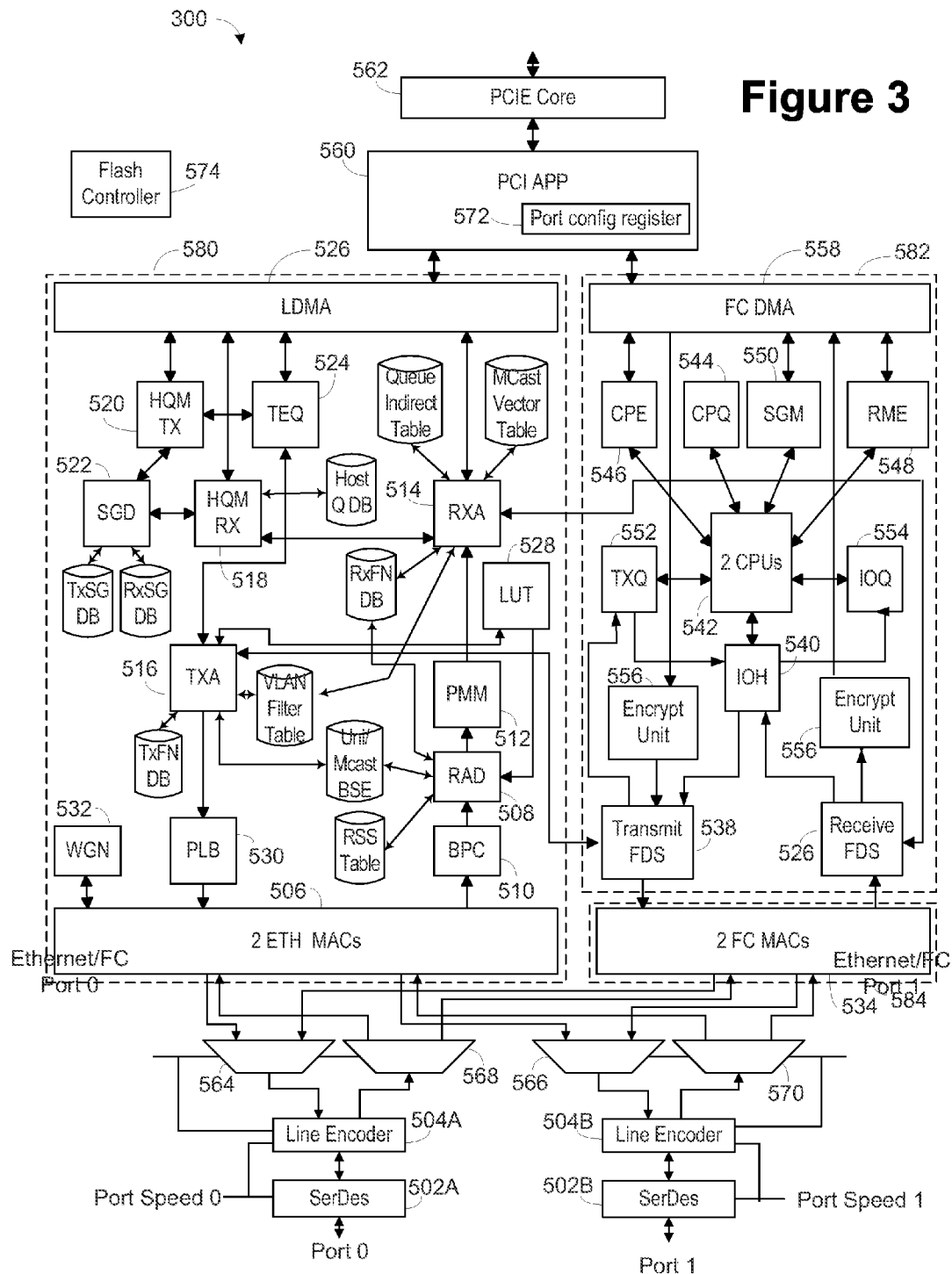
FIG. 3 is a detailed block diagram illustrating the internal structure of a converged network adapter (CNA) according to one embodiment.

FIG. 3 is a detailed diagram of the internal structure of an exemplary CNA 300. The CNA 300 is formed by various modules and databases. They are briefly listed below in table form, with more detailed descriptions following the table.

TABLE 1

| Description of the CNA 300 modules | |
|---|---|
| Serdes 502 | Serializer/deserializer that can be configured as 8/4/2/1G FC or 10/1G Ethernet. |
| Line Encoder 504 | Performs 8b/10b or 60b/66b encoding and decoder, depending on protocol and speed. 8/4/2/1G FC uses 8b/10b while 10G Ethernet uses 60b/66b. |
| Eth MAC 506 | Contains the 10G MAC for 10G and the 1G/100M MAC. |
| RAD 508 | On-the-fly packet parser classifier and integrity checker. |
| BPC 510 | Back Pressure Controller. Responsible for Per-Priority-Pause processing and management. |
| PMM 512 | Packet Manager aggregates and manages inbound packet events and outbound packet descriptors. |
| RXA 514 | Receive Agent evacuates packets from PMM to Host memory and apply further inbound processing to packets. |
| TXA 516 | Transmit Agent accepts Packet Send commands from the HQM through the PMM and sends them through one of 8 PPP queues to the MAC. TXA also arbitrates and pulls FCoE frames from TxFDS to the outbound PPP queues and to the network. |
| HQM RX 518 | Scheduler and the Host Queue Manager for inbound events. It manages RxQs (Receive Queues) and CQs (Completion Queues) |
| HQM Tx 520 | Scheduler and the Host Queue Manager for outbound. Responsible for sequencing outbound events from the Host Send Queues based on relative priority and bandwidth allocation parameters. |
| SGD 522 | Manages scatter-gather vectors for outbound flows |
| TEQ 524 | Tx Event Queue. This contains the Tx event descriptors that are queues from HQM Tx to the TXA. It also contains the short frames that are part of "vector-less send" operations |

TABLE 1-continued

Description of the CNA 300 modules

| | |
|---|---|
| LDMA 526 | Multi-channel DMA engine used with Ethernet side. |
| LUT 528 | Look-up table that contains the Binary Search Engines for Unicast and Multicast CAMs, Function Database and stats blocks for Ethernet frames. |
| PLB 530 | Per-priority Link Buffers. These transmit frames are stored in these buffers before they are sent to the Eth MAC. |
| WGN 532 | This is the Wake-On-LAN/Gigabit MAC/NC-SI block. This contains the Wake-up logic and the NC-SI management interface. All logic that is powered up in Aux power (other than the network MAC) is in this block. |
| FC MAC 534 | This block contains the FC MAC for traditional 8G FC. It also contains the XFM which is the 10G/14G FC MAC. |
| Rx FDS 536 | This holds the inbound FC/FCoE frames received from RxA or from the FC MAC that are headed towards the IOH/CPU. |
| Tx FDS 538 | This holds the outbound FCoE frames that need to be transmitted to the Ethernet MAC through TXA, or FC frames that need to be transmitted to the FC MAC. |
| IOH 540 | This block contains all the hardware acceleration for some classes of FC frames, and a few other frame types. It maintains the IO State Table that holds the context for the FC/FCoE IOs. It interfaces with a number of other blocks (IOQ, FDS, CPU, TxQ) to perform the acceleration. |
| CPUo/1 542 | These are two on-chip CPUs that are used for a number of purposes including initialization of the CNA 300, setting up and tearing down of FC/FCoE IOs, handling of exceptions, processing management frames and so on. |
| CPQ 544 | This holds all the event queues that need CPU processing. CPQ interfaces with a number of blocks on the FC side to route events to the CPUs. |
| CPE 546 | This is the Command Prefetch block that interfaces with the host and DMAs commands to the CPUs for further processing |
| RME 548 | This is the Reply Message block that is used by the CPU to send IO completion information to the host |
| SGM 550 | This block holds the scatter-gather elements for all the IOs processed by the CPU and IOH. It performs DMAs to the host to prefetch/fetch the scatter gather vectors |
| TxQ 552 | This structure holds all the queues and frame related information for Tx frames which are headed towards the TXA or the FC MAC |
| IOQ 554 | This block contains all the IO related queues that are directed towards the host, for FC/FCoE frames. |
| Encrypt Unit 556 | This block contains encryption/decryption logic to perform encryption and decryption operations if needed. |
| FC DMA 558 | This block contains all the upstream and downstream DMA data engines that transfer frames from the FDS to the host or vice-versa |
| PCI APP 560 | This collects DMA requests from LDMA and FC-DMA and sends them to the PCI-E core. It routes completions for these requests back to the LDMA or FC-DMA. It contains the SR-IOV related structures and logic that present a virtualized chip to the PCI-E. It interfaces to the PCI-E core. |
| PCI-E core 562 | This is the SR-IOV PCI-E core that has the Adaptation, Translation, Link and Physical Layer functionality for PCI-E bus transfers to/from the host |

The PCI APP 560 block provides the PCI-E interface to the CNA 300 chip. It can act as PCI-E Master and initiate DMA transfers. It can also function as a PCI-E Target for host accesses. The PCI APP 560 block hides all the PCI-E complexity from rest of the chip 300. It interfaces with PCI-E core 562 on one side and chip blocks on the other side. It supports the following features:

High-Bandwidth datapath to and from host memory.

Cross-clock synchronization between System Clock and PCI-E Clock domains.

Supports outstanding Memory Read Requests on PCI-E interface.

Supports Max Read Request Size of 2 k bytes.

Supports Max Payload Size of 2 k bytes.

Accepts 2 k byte aligned Memory Write requests from DMA block.

Provides the register interface for host programming.

Provides Host-Local CPU Mailboxes.

Provides the shared interface to rest of the chip for all four functions.

The HQM Tx block 520 and HQM RX block 518 provide management and scheduling services for the host work queues and interrupts. The HQM Tx block 520 and HQM RX block 518 provide work for the outbound path and take care of providing all the information required to place the inbound path traffic in the proper host buffers. The HQM Tx block 520 and HQM RX block 518 are responsible for generating completion of the inbound and outbound work information and indications toward the host. This is achieved by working in tandem with the LDMA block 526 that provides DMA services for both the inbound and outbound traffic, with the SGD block 522 that provides the LDMA block 526 with proper scatter and gather information (host vectors and their length) for these DMA services, and with the receive and transmit agents. The HQM Tx block 520 and HQM RX block 518 have dedicated interfaces with LDMA block 526, SGD block 522 and RxA block 514. The HQM Tx block 520 and HQM RX block 518 are responsible for handling work, completions, and interrupts for a single network port.

The LDMA block 526 provides DMA services for the Ethernet path and works in tandem with the FC DMA block 558 that provides DMA services for the Fibre Channel path. These two blocks then converge into the PC APP block 560, which provides a common interface into the PCI-E core 562. The LDMA block 526 provides request channels for transmitted packets, received packets, and general host queue management requests. A private interface to the SGD block 522 provides the necessary translation of queue id based requests into actual host addresses. The following is a list of functions supported within the LDMA block 526:

2 channels for TXA requests.

2 channels for RxA requests.

2 channel for general HQM write requests.

2 channel for general HQM read requests.

Up to 4 outstanding requests per channel on PCI-E bus.

Ordering insured on returning completion data.

Completions with correctable errors discarded but tracked, completions with uncorrectable errors dropped and logged.

Host queue start/stop support.

Interface for configuration, status, and diagnostic registers.

Data in host memory is organized into buffers with an address and length associated with it. The host driver allocates these buffers and prepares address/length pairs in Work Items (WI) which are then pulled on-chip by HQM Tx block 520 and maintained in a database called Scatter-Gather Database (SGD) 522. There are 8 priorities per Tx port, thus 16 Transmit SG Queues for 2 ports. There are 128 RxQs in host memory and correspondingly 128 Rx SG queues. SGD thus provides a total of 128+16=144 SG queues to maintain on-chip Host Vectors.

A single RxQ/TxQ is required to keep a 10 G Ethernet link busy. The average number of on-chip host vectors required for each RxQ is three vectors since one frame will need one Rx buffer. On Tx side, each Tx priority needs 12 host vectors.

When the HQM Tx block 520 processes a Tx Work Item from the host, the control information that the TXA block 516 needs to process the command is passed to the TXA block 516 through command buffers in the TEQ block 524. Each event passes through the TEQ block 524 in FIFO order.

Events that are processed by the TXA block 516 and posted on the TXA event completion interface are made available to the HQM Tx block 520 from the internal queues of the TEQ block 524. All TxQs with completions pending are processed in round-robin order and the winning TxQ is indicated to the HQM Tx block 520 along with a status bit indicating that a completion is available for processing. When the HQM Tx block 520 is ready to initiate an event read, it captures the TxQ index being provided by the TEQ block 524 and asserts a read request towards the TEQ block 524. The event read logic in the TEQ block 524 will capture the HQM Tx block 520 event read request and then must arbitrate for access to the array that contains the event data.

The Transmit Agent (TXA) module 516 receives transmit requests as Ethernet event forms from the Packet Memory Manager block 512 and queue requests from TxQ. It arbitrates between them, and selects one to be processed based on a programmable priority arbitration scheme. The selected transmit event/request results in a packet being sent to the Per Priority Link Buffer (PLB) block 530. As the frames are parsed by the TXA module 516 and depending on the settings in this configuration data, several security checks may be performed to ensure the packet should be sent. Assuming it is the frame is written into the PLB block 530.

In the case of TxQ queue requests, the data flows from the TxFDS block 538 into the PLB block 530 with only the addition of a packet header and possibly the calculation and insertion of an FC-CRC checksum being done for additional processing.

With respect to FCoE frames, the TXA module 516 can handle both "hard FCoE" and "soft FCoE" frames. Hard FCoE frames are pre-generated frames that come from the TxFDS block 538 and have minimal processing done to them by the TXA module 516. Soft FCoE frames are generated by software and sent via the Ethernet path through the TXA module 516.

Functions the TXA module 516 supports:
L3 checksum offload
L4 checksum offload
FCoE checksum offload
TCP segmentation offload
Virtualization source/destination address and VLAN checks
VLAN insertion
VNTag insertion The Priority Link Buffer (PLB) block 530 sits on the data-path between the Transmit Agent (TXA) module 516 and the Ethernet MAC 506. Each Ethernet port has its own PLB block 530. As the name suggests, the PLB block 530 receives L2 synthesized frames from the TXA module 516 and stores them into 8 priority buffers for performing priority based transmission.

The PLB block 530 uses deficit round-robin arbitration to determine the priority buffer whose frame, at buffer head, will be transmitted. The PLB arbiter receives the per-priority network flow control from the BPC block 510 and also the corresponding per-priority flow control from the Packet Manager (PMM) block 512 and uses both sets of flow control information to make the arbitration decision. In addition to flow control, the network interface receives congestion controlling rate-limiter information.

CNA 300 supports stateless TCP offload and the TCP checksum is calculated by the TXA. Since the TCP checksum is calculated over the entire TCP Protocol Data Unit (PDU), the TXA module 516 provides the L4 checksum to the PLB block 530 at the end of the frame transfer. This feature forces the PLB block 530 to operate in store-and-forward mode with the arbitration for a frame beginning only after the PLB block 530 receives the frame in its entirety.

The Back-Pressure Control (BPC) block 510 in the CNA 300 supports the pause function commonly referred to as PPP. This pause function is also referred to as Class Based Flow Control (CBFC). In addition to CBFC, the BPC block 510 also supports the pause function defined in Annex 31B of the IEEE 802.3 specification.

The BPC block 510 sits between the Ethernet MAC 506 and the Receive Admission block (RAD) 508. The BPC block 510 examines every received packet and does not forward the pause frames to the RAD block 508. For the received pause frames the BPC block 510 takes the appropriate action and either pauses or un-pauses the transmitter. The BPC block 510 also takes information from the Packet Memory Manager (PMM) block 512 to determine when to transmit pause frames. The BPC block 510 uses the status information from the PMM block 512 to generate either standard pause frames or CBFC pause frames. These are sent to the Per-Priority Link Buffer (PLB) block 530 and are treated as the highest priority in its arbitration for the MAC transmit interface.

The Lookup Table Module (LUT) 528 provides support services to the mainline transmit and receive blocks in the Ethernet side of the CNA 300. Software/firmware uses the register interface to write configuration information into the various array structures as well as to read back statistics that have been updated by the hardware. The LUT block 528 provides support for a single Ethernet port. It is instantiated twice in the CNA 300, once for each port. Specific supported functions are described below:
Associates a 48 bit MAC unicast address with one of 64 port specific functions.
Associates a 48 bit MAC multicast/broadcast address with 1 of 256 multicast vectors in the RxA block 514. If no exact match is found, an 8 bit hash is provided instead.
Provides Ethernet configuration data requested by the RAD block 508, RXA block 514, and TXA module 516.
Updates function specific frame and byte counts as indicated by RXA block 514 and TXA module 516.
Provides function specific VLAN configuration information to the RXA block 514 and TXA module 516.

Ethernet frames which are received by the Eth MAC 506 are forwarded to the Receive Admission (RAD) block 508. The RAD block 508 parses the packet to check for errors and obtain information about the packet. For example, the RAD block 508 determines if it is an FCoE packet or a TCP/IP packet and determines the offsets of the various protocol headers in the packet. The RAD block 508 also assists the RxA block 514 in determining on which receive queue to send the packet up to the system.

The RAD block 508 uses a CAM to return a function ID that is associated with the destination MAC address. This function ID can then be used to generate an RSS hash which the RxA block 514 uses to determine the receive queue. Depending on the priority of the packet and the target queue, (RxA block 514 or RxFDS block 536), the RAD block 508 will send the packet to 1 of 16 queues. It will also update a form with the information it determined when it parsed the packet.

The RAD block 508 performs packets classification based on:
- DA MAC address lookup
- Multicast DA address lookup
- Compute Multicast address hash
- RSS computation (Configurable hash types).
- Performs error checking such as checksum/crc errors, etc.
- FCoE path classification
- Header parsing—Identify L3/L4/L5 offsets
- L3 header checksum validation
- L4 (TCP/UDP) checksum validation
- Intercepts Congestion Management frames (BCN) and MAC Management frames and forward them to the RxFDS block 536 queue.

The Packet Memory Manager (PMM) block 512 is responsible for storing of incoming and outgoing forms and packets and managing the data traffic between the different processing engines. The PMM block 512:
- Provides packet storage per port and per priority.
- Performs packet bookkeeping per port and per priority.
- Implements form routing between queues and interfaces.
- Arbiters the memory access to both data and control memory per interface and access type.
- Applies back pressure to the BPC block 510 according to predefined watermarks per priority.

The RxA module or block 514 provides services to enable the transfer and flexible routing of received frames from on-chip buffers to either the Ethernet driver in the host or to buffers associated with the Fibre Channel logic. Frames are delivered to the RxA module 514 by the PMM block 512 via 8 priority queues for Ethernet frames and 8 priority queues for FC frames. Once a frame is available on the PMM interface, the logic in the RxA module 514 uses information collected from internal data structures as well as several external interfaces to determine where the received data is destined, and exactly how it must be transferred. In addition to the basic priority based processing provided for all received Ethernet and FC frames, the following features are supported on a per-function basis for Ethernet frames:
- Header Data Split (HDS) for unicast IP/TCP/UDP frames without IP options.
- Receive Side Scaling (RSS) support
- Multi/Broadcast spraying
- Small/Big Buffer Thresholding only for IP/TCP/UDP The PCI-E APP block 304 connects the PCI-E core 562 to the LDMA block 526 and the FC DMA block 558. Briefly, the SGM block 550 is connected to the FC DMA block 558 and the CPUs 542. The FC DMA block 526 allows for bus mastering in the CNA 300, i.e., to move data to and from the host memory.

An I/O command is fetched via the PCI-E core 562 and PCI-E APP block 560 by the FC DMA block 558, which forwards the command to the CPQ block 544.

On the FC side of the CNA 300, two Fibre Channel media access controllers (MACs) 534 provide an interface to a SAN fabric. An upstream path between the FC MACs 534 and the PCI-E APP block 560 comprises receive buffers in a receive frame data storage unit (RX FDS) block 536, an encryption unit 556, and the FC DMA block 558. A downstream path between the FC MACs 534 and the PCI-E APP block 560 comprises the FC DMA block 558 an Encryption Unit 556, and transmit buffers in a transmit frame data storage unit (Tx FDS) block 538. The Tx FDS block 526 and the Tx FDS block 538 communicate with the CPUs 542, and the Tx FDS block 538 additionally communicates with the transmission queue (TxQ) block 552. A crossbar I/O handler (IOH) block 540 receives data from the FC MACs 534 and communicates with the transmit FDS block 538, the CPUs 542, and the IOQ block 554. The IOQ block 554 communicates with the IOH block 540, the FC DMA block 558, and the CPU queue (CPQ) block 544. The CPQ block 544 receives data from the IOQ block 554, the TxQ block 552, and the FC DMA block 558, and transmits data to the CPUs 542.

Operation of the components of the Fibre Channel side may be explained by discussing I/O flow in the CNA 300, based on example commands. I/O flow in the CNA 300 comprises three phases: a command phase, an execution phase (comprising, e.g., execution of a read command or a write command), and a completion phase.

The command phase is initiated by the FC DMA block 558 in the CNA 300, in conjunction with the issuance of a command from a host CPU to a source device (in the case of a read) or a target device (in the case of a write) in a SAN fabric Briefly, an I/O command is originated by a host CPU, and the FC DMA block 558 fetches the I/O command from the I/O command ring in the host's memory and schedules a request to a processor 542 for execution. Preferably, each command entry has a bit allocated to decide which CPU 542 the command is scheduled to. Any remaining definitions for the request are defined in software.

The FC DMA block 558 comprises eight engines, each engine prefetching commands from I/O command rings in host memory. The FC DMA block 558 is configured such that the host blade is the producer and the CNA 300 is the consumer (i.e., the FC DMA block 558 emulates a FIFO in the host memory). The difference in producer-consumer pointers (referred to as the producer-consumer index) tells the FC DMA block 558 when the message rings in the host memory are not empty. Based on the producer-consumer index, the FC DMA block 558 queues a new command to one of the two CPUs 542 for execution. In a preferred embodiment, the FC DMA block 558 operates on fixed data sizes and memory addresses.

In further detail, a command phase is initiated when a host provides a command pointer to the CNA 300. The FC DMA block 558 queues the new command from the originating I/O command ring in the host memory by adding any necessary processor tags that define which CPU 542 is to perform the command. As long as there is a transmit buffer in the transmit FDS block 538 available for the channel associated with the entry in the I/O command ring, the FC DMA block 558 allocates a buffer, reads the entry, writes that data into the allocated buffer in the transmit FDS block 538, and queues the allocated buffer into a dedicated queue in the CPQ block 544 (discussed below) for the appropriate CPU 542. The command is forwarded from the CPQ block 544 to the appropriate set of message registers in one of the CPUs 542. The CPU 542 processes the request by setting up a state table in the IOH block 540 for the command and for related exchanges.

If the request is an accelerated I/O (i.e., a read command or a write command), the CPU 542 allocates an originator exchange identifier (OXID) and sets up the scatter-gather state in SGM block 550, the I/O state table in the IOH block 540, and the encrypt state in one of the Encryption Unit 556. Then, the CPU 542 creates the FCP command frame and queues the FCP command frame to the TxQ block 552. Assuming that the I/O proceeds normally, the CNA 300 continues processing received I/O data frames without any CPU intervention. When processes related to the command phase are complete, the FC DMA block 558 moves on to check the next command entry in the host memory, thus continually queuing new entries.

The CPQ block 544 functions as an event scheduler in the CNA 300. The CPQ block 544 allows commands to be processed by a CPU 542. Functionally, the CPQ block 544 is a set of queues that point towards the CPUs 542. The CPQ block 544 provides two independent sets of queues with scheduling functions to the CPUs 542, so that one CPU is not blocked by resource limitations on the other CPU. Based on the type of event and its priority, different queues are maintained for events for each CPU. The CPQ block 544 follows a "push" model, which implies that events are queued to the CPU 542 by the CPQ block 544, rather than the CPU pulling events to process from these queues. The CPQ block 544 scans the event queues and based on a pre-determined priority, pulls out an event from a particular queue to submit it to the corresponding CPU 542. This mechanism improves firmware efficiency by avoiding utilization of a "polling" scheme by the CPUs 542.

Data sent to the CPQ block 544 may be sent from the FC DMA block 558, the IOQ block 554, or the TxQ block 552. The queues in the CPQ block 544 provide a mechanism for hardware adjacent to the CPUs 542 to inform the CPUs 542 of events on which the CPU software can act. One skilled in the art will appreciate that numerous queues exist or may be defined for events which need to be acted upon. In a preferred embodiment according to the invention, each independent set of queues in the CPQ block 544 includes: a Host Command Queue for new commands that the FC DMA block 558 pulls from host memory; a FC Receive queue dedicated to incoming FC frames that the other hardware components in the CNA 300 will not act on or be able to resolve; a Transmission Queue buffer release queue for when a local processor 542 generates a frame and ships it to the Fibre Channel; a Transmission Queue timeout queue for when a frame times out in the transmission queue; an IOH Timeout queue for timeouts seen by the I/O handler block 540; separate IOST Timeout queues for when read and write I/O processes time out; a single-deep Host Mailbox queue, for direct host-to-CPU communication; and a CPU Mailbox queue for messages passed between CPUs 542. The CPQ block 544 additionally includes an interrupt queue, for routing any interrupts to the CPUs 542. Interrupts are routed to one of the two CPUs 542, depending on the process the interrupt is directed to. In one embodiment according to the invention, the interrupt queue is a single-deep queue. The enqueue to the CPQ block 544 is based on one of the above events. Dequeuing is based on a CPU 542 being able to accept another request.

The execution phase corresponding to a read command, e.g., from a host blade for resources on a source network component in a fabric, commences after completion of the command phase discussed above, where the command is a read command from the CPU of a host. At a high level, the read command is sent from the CPU 542 to the source network component in the FC fabric via the transmit FDS block 538 and the TxQ block 552. Upon receiving the read command, the source network component sends a response in the form of Fibre Channel data (i.e., the data the host intends to read) to the CNA 300. A source that has received a read command from the CNA 300 sends read data frames to the CNA 300 via the Fibre Channel fabric. The read data frames are received on an FC receive port via an FC MAC 534.

The FC MACs 534 serve as interfaces between outside Fibre Channel links and logic internal to the CNA 300. Thus, the FC MACs 534 are responsible for converting downstream (outbound) data to an appropriate FC sequence, and for converting upstream (incoming) data from an FC sequence. The FC MACs 534 include a Fibre Channel protocol manager (FPM), which maps command data onto a Fibre Channel sequence, and maps received data from a Fibre Channel sequence.

From the FC MACs 534, the data in a frame is sent to receive FDS block 536 and portions of the data are provided to the IOH block 540. In general terms, the IOH block 54*o* performs necessary functions related to accelerated FCP processing, and the receive FDS block 536 performs two functions: it stores incoming frames from FC wires, and it acts as a buffer for communication from CPUs 542 to the host. The CNA 300 has two independent FDS units block 536 and block 538 (i.e., one each for transmit and receive data paths), each comprising a plurality of buffers. The buffers in the receive FDS block 536 are divided into four groups: two for the FC MACs 534, and one group for each of the CPUs 542. In an upstream flow, data is received via a buffer in the receive FDS block 536. The receive FDS block 536 stores the frames received on the FC ports that are uplinked to host memory.

As multiple data frames may be sent with some overlap, the IOH block 540 captures all upstream and downstream frames and associates the transmissions with the correct process. In the context of a read command, the IOH block 540 validates each incoming frame, associates the frame with the appropriate I/O, and queues the frame to the IOQ block 554. In a preferred embodiment, the IOH block 540 associates the data in properly validated frames to the correct I/O process and forwards this association to the IOQ block 554. Validation, in the context of the IOH block 540, includes checking all incoming frames for consistent, valid primitives, i.e., a start of frame (SOF) field, an end of frame (EOF) field, and a cyclic redundancy code (CRC). Any frame with an inconsistent SOF or EOF, an invalid EOF, or a failed CRC is preferably discarded with its buffer queued to the receive FDS block 536 for deallocation.

Following validation, the frame is parsed by the IOH block 540 to figure out whether the frame maps to any currently active I/O process. More specifically, the IOH block 540 utilizes routing state tables to control the flow of the upstream data. The IOH block 540 comprises an I/O state table, and the incoming data frame is looked up in the I/O state table (IOST). If the frame does not map to a currently active I/O process, then the frame is sent to one of the CPUs 542 for appropriate handling. If the frame does map to a currently active I/O process, then the IOH block 540 determines the next operation to be done on that I/O process and routes the frame through a hardware accelerated path, using the IOQ block 554 to execute the operation. Specifically, the IOH block 540 provides commands to the IOQ block 554, which routes the commands to the appropriate block in the CNA 300, and consequently, to the appropriate host (e.g., host blade).

In the context of a read command, the IOQ block 554 schedules the frames to the FC DMA block 558. The I/O queue block (IOQ) block 554 is a queue of all pending events for I/O processes that are currently active. The IOQ block 554 comprises three queues: a downlink queue, an uplink queue, and an uplink message queue. For host initiated read commands, the queues in the IOQ block 554 hold the read data frames and transfer the payload from these frames into the appropriate location in the host memory.

Concurrent to the IOQ block 554 routing discussed above, the receive FDS block 536 sends blocks of data to the Encryption Unit 556, which detaches data integrity fields, decrypts and authorizes data, and performs any necessary data format conversion. Thus, in a preferred embodiment according to the invention, DIF operation may be performed on the way to the host memory. Once decryption tasks are complete, the data is forwarded to the FC DMA block 558.

The FC DMA block 558 receives the data from the Encryption Unit 556, and works with the SGM block 550 to continuously move data for all the frames related to the command to the host memory. In other words, DMA transfers for read operations in the CNA 300 are accomplished by the FC DMA block 558 with the aid of the SGM block 550, which allows the transfer of data to multiple memory areas in a single DMA transaction. In coordination with the SGM block 550, the FC DMA block 558 sends incoming data from the buffers in receive FDS block 536 to the host via the PCI-E APP block 560 and the PCI-E core 562.

More specifically, the FC DMA block 558 determines whether data corresponds to the read command based on information it receives from the IOQ block 554. The FC DMA block 558 strips header and trailer information from received data that corresponds to the response to the read command, and uses the SGM block 550 to send the data to the appropriate host. Once the FC DMA block 558 has completed its processing, the IOQ block 554 releases the receive buffer in FDS block 536, and schedules the next frames.

The FC DMA block 558 is capable of working under multiple I/Os at the same time in order to utilize the available bandwidth on the PCI link. The data portion of any FCP I/O process is mapped to a linked list of addresses in the host memory, which is referred to as scatter/gather list. For each FCP I/O process, the CPU 542 sets up the initial pointer to the scatter/gather list and then hands over control to the scatter/gather manager (SGM) block 550. The SGM block 550, under control of the IOQ block 554, keeps getting the next set of addresses from the host on an as needed basis. These are the addresses where data is written to when working on an initiator read command.

The execution phase as it corresponds to a write command, e.g., from a host to a network component in a fabric, commences after completion of the command phase discussed above, where the command is a write command from the CPU of a host. A write command is sent from the CPU 542 to the target device in the FC fabric through the transmit FDS block 538 and the TxQ block 552, as discussed above. When the target device is ready to accept the write, it sends a "transfer ready" message to the CNA 300. From the Fibre Channel fabric, the CNA 300 receives the transfer ready message from the target on a port in FC MAC 534.

The IOH block 540 validates the transfer ready message and then continually instructs the IOQ block 554 to generate write data frames for the I/O until the transfer data is exhausted. After the IOH block 540 receives the transfer ready message, it creates a header for the write data (from the host) and instructs the IOQ block 554 regarding appropriate frame sizes to be sent from the host.

As mentioned above, DMA transfers for read and write operations in the CNA 300 are accomplished with the aid of the SGM block 550. The downstream DMA controller 310 sends data from a host to a Fibre Channel device. More specifically, data is sent from the downstream DMA controller 310 to the Encryption Unit 556 in coordination with the SGM block 550.

The data portion of any FCP I/O is mapped to a linked list of addresses in the host memory. This linked list is referred to as scatter/gather list. For each FCP I/O, the CPU 542 sets up the initial pointer to the scatter/gather list and then hands over control to the SGM block 550. The SGM block 550, under control of the IOQ block 554, continually retrieves a next set of addresses from the host on an as-needed basis. These are the addresses where data is read from when working on an initiator write command or where data is written to when working on an initiator read command.

For host initiated writes, the IOQ block 554 holds at most a single event per I/O to generate the next write data frame. The IOQ block 554 merges the payload from the host blade and the header from the IOH block 540 to form a write data frame and then queues the frame to the TxQ block 552. The IOQ block 554 allocates a buffer from one of eight pools and instructs the FC DMA block 558 to generate the next data frame for the I/O. The IOQ block 554 also informs the IOH block 540 when the frame is queued to the TxQ block 552.

The FC DMA block 558 pulls data from the host memory and pushes it onto the transmit FDS block 538 under control of the IOQ block 554. The FC DMA block 558 is capable of working under multiple I/Os at the same time to utilize the available bandwidth on the PCI link. More specifically, the FC DMA block 558 works with the SGM block 550 and downloads the data into the allocated transmit buffer block 538, and then queues the transmit buffer block 538 to the TxQ block 552. The data is retrieved using the SGM block 550 and FC DMA block 558, is split into the appropriate frame size(s), and is merged with the header in the transmit FDS block 538. DIF operation may be performed in the Encryption Unit 556 on the way to a buffer in the transmit FDS block 538, as discussed above with respect to a read command. More specifically, the Encryption Unit 556 attaches data integrity fields, encrypts and authorizes data, and performs any necessary data format conversions.

As mentioned above, the CNA 300 has two independent FDS units block 536 and block 538 for transmit and receive data paths. The transmit FDS block 538 stores frames that are downlinked from the host memory and transmitted out on Fibre Channel (FC) ports. In a downstream flow, data is sent to a transmit FDS block 538 after encryption. The transmit FDS block 538 comprises a plurality of buffers to perform two functions: to carry frames that may eventually be transmitted on FC wires, and to act as a buffer for communication from the host to the CPUs 542. In a preferred embodiment, the transmit FDS block 538 comprises 240 buffers that are preferably divided into 18 groups, referred to as "virtual channels." These virtual channels map to the message rings in the host. Each virtual channel has two groups of buffers in the transmit FDS block 538. A first group of buffers is used to allocate buffers for the messages from the host, and the other group is used to allocate buffers for the data frames that the CNA 300 generates. Additionally, a group of buffers is reserved for each CPU 542.

The transmit FDS block 538 performs segmentation and reassembly (SAR) duties before the data is sent to a FC media access controller (MAC) 534, where the data is processed and sent on an FC network. The transmit FDS block 538 also sends completion messages to transmission queue (TxQ) block 552, concurrent with or after sending the data to an FC MAC 534.

After the CNA 300 has initialized (i.e., is write transfer ready), it generates data frames honoring FC-FS, FCP and target specific rules. No CPU intervention is necessary during this phase, assuming that the Sequence ID of the write is statically allocated to an I/O process. The data is then sent to the appropriate destination in the FC fabric via the transmission queue and the FC MAC 534.

After completion of a command, a response frame (i.e., a completion) is sent by the target/source to the host through the CNA 300. The response frame is captured by the IOH block 540 and the receive FDS block 536. The IOH block 540 associates the response frame with the correct I/O process, confirms the nature of the response, and sends the response frame via the IOQ block 554 and the CPQ block 544 to the appropriate register in one of the CPUs 542. More specifically, the response frame is queued in the CPQ block 544, and when the CPU 542 receives the response frame, the CPU 542 uses the appropriate buffer in the receive FDS block 536 to build a completion, and sends the completion to the host that originated the command via the FC DMA block 558, the PCI-E APP block 560, and the PCI-E core 562. The FC DMA block 558 moves the response frame from the receive FDS block 536 to the host memory, and then releases the receive FDS block 536.

The FC DMA block 558 operates in a manner similar to the FC DMA block 558 discussed above. The FC DMA block 558 creates a FIFO in the host memory such that the CNA 300 is the producer and the host blade is the consumer, and has eight different reply rings (also referred to as DMA virtual channels) mapped to the corresponding completion rings in the host 202. The FC DMA block 558 strips any processor tags that were added to the completion data and pushes the completion back to a completion ring in the host memory.

The FC DMA block 558 returns reply messages (prepared by the CPUs 542) from the receive FDS block 536 to host memory to complete an initiator mode I/O command or to start a target mode I/O. The FC DMA block 558 supports eight concurrent reply rings (DMA virtual channels). The reply ring is a circular queue structure with a statistically defined depth. The host blade owns the consumer index while the FC DMA block 558 owns the producer index. The producer index and consumer index are both registers in the FC DMA block 558. The producer index is writable by the FC DMA block 558 and read only by the host blade, while the consumer index is writable by the host blade and read only by the FC DMA block 558. The FC DMA block 558 maintains a shadow producer index register located in the host system memory. New reply message discovering on host blade side is accomplished by the host blade pulling the shadow producer index value based on interrupts (i.e., an interrupt coalescing mechanism is implemented). The FC DMA block 558 ensures that the reply queue FIFO is not overrun by checking the producer index and the consumer index. The host blade checks the producer index and the consumer index to determine how many new outstanding reply messages exist, and then processes them based on the exchange IDs. The FC DMA block 558 maintains eight state machines (one on each virtual channel) to control the requests from the CPUs 542. The FC DMA block 558 re-asserts an 'available' signal as an indication to the IOQ block 554 after the message is moved up to the host blade, so that the CPUs 542 and the IOQ block 554 can release the appropriate frame buffer in the receive FDS block 536. The FC DMA block 558 implements DMA with fixed write burst lengths of 64 or 128 bytes, as discussed above.

The CPUs 542 perform various functions in the CNA 300 too complex to be performed by other hardware, such as translation of requests from a host blade, handling the command phase of a request, and completion of a request as it relates to a FC port and to a host blade. The CPUs 542 have identical configurations and interface logic, and further, the CPUs 542 are not hardwired to a specific FC port. Thus, while two CPUs 542 are discussed for the purposes of example, one skilled in the art will appreciate that the CNA 300 may comprise any number of CPUs, as well as different registers therein, without departing from the scope of the invention. Each CPU 542 comprises interface logic to connect to other modules in the CNA 300.

The transmit paths of the Eth MACs 506 and the FC MACs 534 connect to two multiplexers 564, 566, with one port to each multiplexer. The selection of multiplexer 564 is the Ethernet/FC port 0 selection bit, while the Ethernet/FC port 1 selection bit is used with multiplexer 566. By appropriately setting the selection bits, any of the three modes can be selected. The outputs of the multiplexer 564 and 566 are provided to line encoders 504A, 504B. The line encoders 504A, 504B receive the appropriate Ethernet/FC port selection bit and port speed bits, which identify the desired port speed, to determine the proper line encoding/decoding, either 8b/10b or 60b/66b for the preferred embodiments. The transmit outputs of the line encoders 504A, 504B are provided to the serdes 502A, 502B. The serdes 502A, 502B receive the appropriate port speed bits to match the serdes to the desired speed. The serdes 502A, 502B then provide transmit signals from the CNA 300.

The serdes 502A, 502B receive the receive signals provided to the CNA 300. The receive outputs of the serdes 502A, 502B are provided to the line encoders 504A, 504B. The receive outputs of the line encoders 504A, 504B are provided to demultiplexers 568 and 570. One output of demultiplexer 568 is provided to the Eth MAC 506 while the other output of demultiplexer 568 is proved to the FC MAC 534. Similarly, the outputs of the demultiplexer 570 are also provided to the Eth MAC 506 and the FC MAC 534. The Ethernet/FC Port 0 select bit is used with demultiplexer 568 and the Ethernet/FC Port 1 select bit is used with demultiplexer 570.

Thus each port can be Ethernet/FCoE or FC based on the port select bits. This allows two Ethernet/FCoE ports, two FC ports or one Ethernet/FCoE port and one FC port, either port being one protocol and the other port being the other protocol.

In the preferred embodiments the CNA 300 has several internal power domains. Of most relevance to this multi-function discussion are the Ethernet domain 580, the FC engine domain 582 and the FC MAC domain 582. If the CNA 300 is configured only for FC operation, power is turned off to the Ethernet domain 580. If the CNA 300 is configured for FCoE/Ethernet operation, the FC MAC domain 582 is turned off. The FC engine domain 582 must remain on to handle FCoE frames. If the CNA 300 is operating in an Ethernet-only environment and no FCoE operations will occur, then the FC engine domain 582 can also be turned off. In this manner the power usage of the Ethernet/jFC chip 300 is minimized based on the actual protocols being utilized.

As discussed above, the CNA 300 has three different modes of operation and is controlled by Ethernet/FC port select bits. The personality of the CNA 300 is set up through the Flash memory 308 in one embodiment. Before turning on the core and CPU PLLs, a number of these registers are loaded from the Flash memory 308 to set up the device correctly. Since the CNA 300 is a mixed mode device, the port personality needs to be defined first. The port personality is used by the line encoder and SERDES blocks to decide on which protocol to which port.

The Port Configuration Registers 572 reside in the PCI-E APP block 560, so they are not accessible in the aux power mode. However, a copy of the register bits is present in the Flash Memory 308 and used by WGN block 532 as well.

Two registers define the port configurations. These are illustrated in Table 2 and Table 3 below.

TABLE 2

Port Personality Register (one per port)

| Register field | Field location | Default Value | Description |
|---|---|---|---|
| port_is_FC | 0:0 | 0 | This bit indicates whether the port is an FC port or an Ethernet port. |
| FC_port_speed | 2:1 | 0 | 00 = reserved<br>01 = reserved<br>10 = reserved<br>11 = 8G FC |
| port_is_dual_8G | 3 | 0 | If this bit is set, then 2 8G ports will be used to transfer 16G using Brocade FC trunking. In this mode two SERDES lanes transfer data across the backplane to an attached switch |

TABLE 3

PF personality register (one per PF)

| Register field | Field location | Default Value | Description |
|---|---|---|---|
| Active | 0:0 | 0 | Activate PF |
| Personality | 1:1 | 0 | 0 = Ethernet 1 = FC |
| line_port | 3:2 | 0 | 00 = port 0<br>01 = port 1<br>1x = both ports 0 and 1 (link aggregation mode) |

Figure 4:
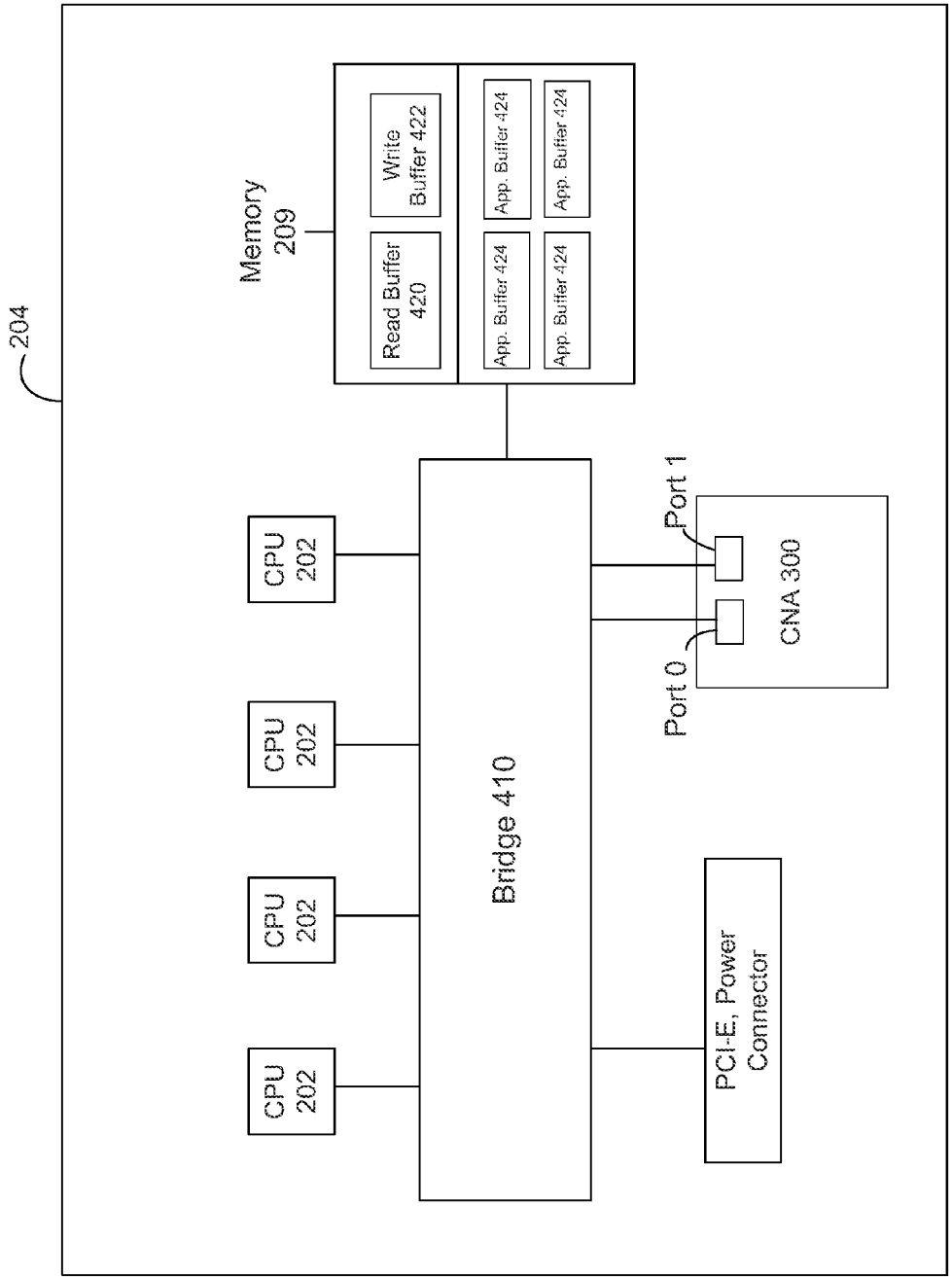
FIG. 4 is a detailed block diagram of a host having a CNA according to one embodiment.

FIG. 4 illustrates a more detailed diagram of a host blade 204. As discussed before, in the preferred embodiment, the HBA/CNA port pair involved in the diagnostics method is made up of an input/output pair. For a path beginning and ending at the same host, the input/out port pair used in the diagnosis are ports 0 and 1 of the CNA/HBA, such as the ports 0 and 1 of the CNA 300 illustrated in FIG. 4. As shown, the bridge 410 connects the CNA 300 to the host memory 209 and the host CPUs 202. The host memory 209 includes application buffers 424 and read and write buffers 420 and 422 which can be used in the diagnostic tests. For example, port 1 of the HBA ports may be in communication with the read buffer 420 and port 0 may be in communication with write buffer 422. The buffers make it possible to run the diagnostic tests at full speed because they can be used as circular buffers, so the read buffer 420 always has data available and the write buffer 422 can always receive data.

Figure 5:
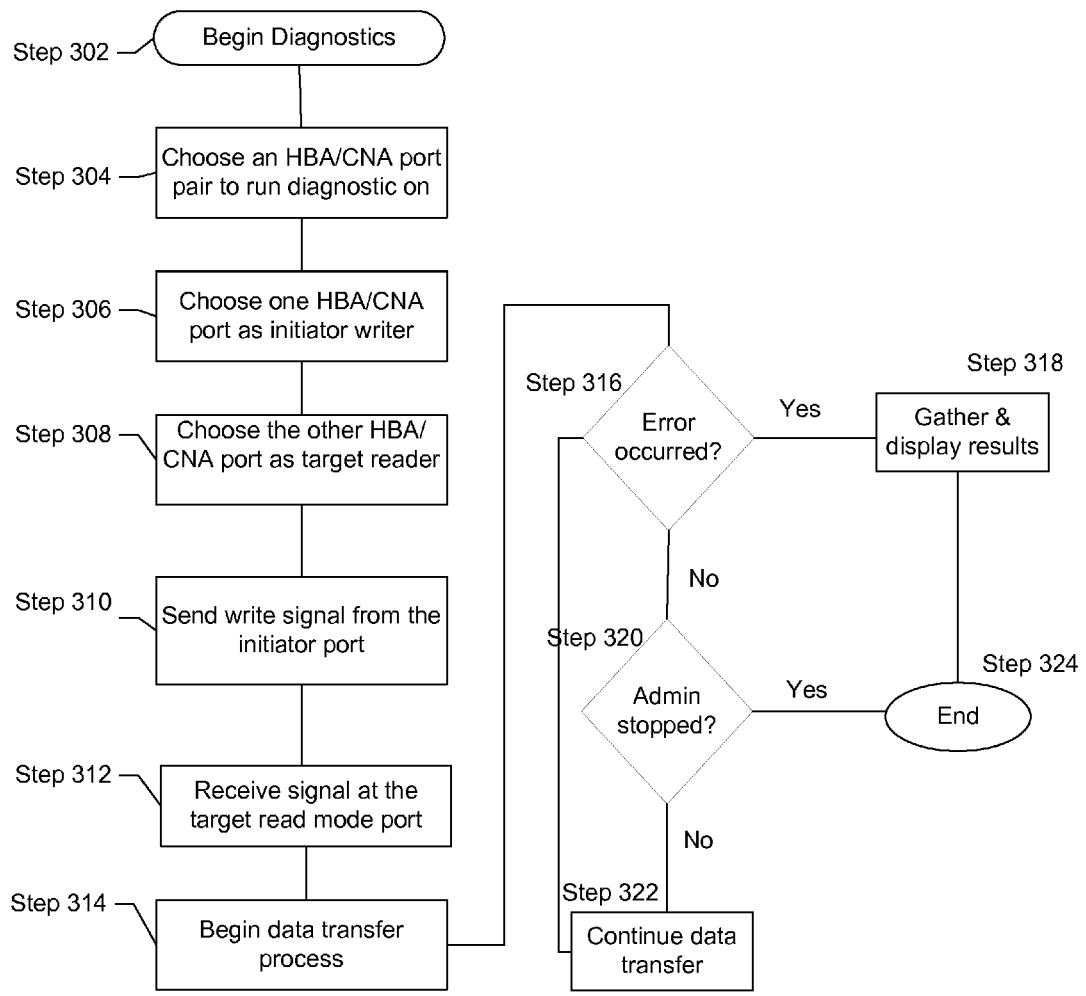
FIG. 5 is a flowchart illustrating a method for performing HBA/CNA port diagnostics according to one embodiment.

As illustrated in FIG. 5, the diagnostic method in the preferred embodiment of the present invention begins at step 302. At Steps 304 and 306, two HBA/CNA ports will be selected to run the diagnostics tests from. The two HBA/CNA ports can either be in the same HBA/CNA or in separate HBAs/CNAs. Based on the chosen HBA/CNA ports, a path connecting the two HBA/CNA ports is then automatically defined. After the diagnostic path has been defined, an administrator selects one of the HBA/CNA ports as an initiator/writer and the other one as a target/reader at steps 306 and 308. This causes buffer space to be allocated in each host memory and test data to be placed in the initiator buffer. Further, the buffers are set up in the CNA 300 to be circular buffers so that the DMA block 526/558 can always have available data or space. As the DMA blocks 526/558 have multiple channels, one channel can be designated for the diagnostic transfers and the remaining channels can continue to handle normal data transfers. The normal data transfers may be at a reduced rate due to the full bandwidth capability of the diagnostic operation, but they will continue. This allows online use, as opposed to the D_port operation of the prior art. Therefore, diagnostic operations can be more readily performed in a normal production environment.

Then, at step 310, the method will saturate the bi-directional bandwidth of the selected path by sending out a write signal from the initiator writer at the optimum line rate. The signal travels throughout the path and arrives at the second port. Thus the second port receives the signal in the target read mode, at step 312. At step 314, the initiator begins the data transfer process. At step 316, the system determines if an error has been encountered. The method flags errors by providing an output that determines the data transmit and receive rates. If the rate differs from the optimum line rate, the path is flagged as being a faulty path. If an error has occurred, the error statistics of the path may be gathered and displayed to aid the diagnosis at step 318. Otherwise, the data transfer process continues until the administrator stops the test at step 320.

Accordingly, HBAs/CNAs can be used to run one or more link level diagnostic tests with minimal user intervention and provide comprehensive test results. The diagnostic tests performed through the online HBA/CNA ports achieve one or more of the following: 1) test both ends of a link's connectivity to validate that the link is within dB budget; and 2) saturate a link with a representative SAN traffic profile to validate fabric performance.

This diagnostic method can be initiated by a user (e.g. a network administrator) through an application accessed on an administrative workstation such as the computer system 104 of FIG. 1. The application may include one or more user interfaces or GUIs (not shown) that enable the user to identify the HBA/CNA ports that define the path to be diagnosed and to turn on the diagnostic mode. Turning on the diagnostic mode may start running the method 500 automatically on the identified path. In other embodiments, the user may initiate each step of the method 500. In one embodiment, the user is able to decide which diagnostic tests to run on the path. After the diagnostic tests have been performed, the result may be presented to the user for analysis.

The diagnostic application may be provided on any desired non-volatile computer-readable program storage media including, but not limited to, all forms of optical and magnetic media, including solid-state, storage elements, and removable media. The application workstation 104 may be any desired type of computational device, including a virtualized computer executing on any real hardware platform desired.

In addition to using the diagnostic application, the diagnostic method of the present invention may use a command line interface (CLI) implemented in the HBAs/CNAs to allow the user to initiate the diagnosis. In such an embodiment, the diagnostics can be initiated using the HBA/CNA's WWW as a parameter to the diagnostic command. The process may include querying the hosts in the network 200 for the list of ports and then sending diagnostic requests for the selected HBA/CNA ports. The diagnostic command may result in a message indicating successful or unsuccessful completion of the diagnostic tests and/or displaying the test results.

In one embodiment, a test initiator port, such as the port 10 illustrated in FIG. 2B, initiates the diagnostic tests, while a port at the other end of the path, referred to as the target/responder port 12, responds. In one embodiment, the ports are designated as an initiator or responder based on a pre-determined characteristic of the ports such as their World Wide Number (WWN). For example, the port having a higher WWN may be designated as the initiator, while the port having a lower WWN may get designated as the responder.

Although described above generally in terms of FC fabrics and using FC terminology, the problems and techniques for online path diagnostics are not limited to FC fabrics and protocols, but may be implemented using similar techniques to those described above in Ethernet and other types of networks, including lossless networks using IEEE Data Center Bridging. Accordingly, the diagnostic tests can be utilized to perform path level sanity tests in Fibre Channel, Ethernet, FCoE networks and other networks. To achieve this diagnostic testing, two HBA/CNA ports at each end of a path are either identified by a user or chosen automatically. The entire diagnostics procedure can be performed without taking any ports or servers offline.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A host device comprising:
   a memory containing a diagnostic buffer and at least one application buffer; and
   a network adapter card coupled to said memory, said network adapter card including a first external port and at least two DMA channels, said at least two DMA channels capable of transmitting data in a same direction concurrently;
   wherein a first DMA channel of the at least two DMA channels is coupled to said diagnostic buffer and at least one DMA channel is coupled to said application buffer, said network adapter card coupling said first external port and said at least two DMA channels to allow concurrent data transfer.

2. The host device of claim 1, wherein said network adapter card further comprises:
   a second external port;
   wherein said network adapter card couples said second external port and said at least two DMA channels to allow concurrent data transfer;
   wherein a second DMA channel is coupled to said diagnostic buffer; and
   wherein said network adapter card can transfer data from said diagnostic buffer through said first and second external ports and back to said diagnostic buffer.

3. The host device of claim 1, wherein said network adapter card performs error monitoring on data transfers through said first external port.

4. The host device of claim 1, wherein said diagnostic buffer, said network adapter card, said first DMA channel and said first external port are configured to allow transmission of diagnostic frames at an optimized line rate of said network adapter card.

5. A network comprising:
   a first device including a first memory and a first network adapter card coupled to said first memory, said first memory containing a first diagnostic buffer and at least one application buffer and said first network adapter card including a first external port and at least two DMA channels, said at least two DMA channels capable of transmitting data in a same direction concurrently; and
   a network fabric connected to said network adapter card through said first external port;
   wherein a first DMA channel of the at least two DMA channels is coupled to said first diagnostic buffer and at least one DMA channel is coupled to said application buffer, said first network adapter card coupling said first external port and said at least two DMA channels to allow concurrent data transfer between said network fabric and said first diagnostic buffer.

6. The network of claim 5, further comprising:
   a second device including a second memory and a second network adapter card coupled to said second memory, said second memory containing a second diagnostic buffer and at least one second application buffer, said second network adapter card including a second external port and at least two second DMA channels, said at least two second DMA channels capable of transmitting data in a same direction concurrently;
   wherein said second network adapter card is connected to said network fabric through said second external port;
   wherein one DMA channel of the two second DMA channels is coupled to said second diagnostic buffer and at least one DMA channel of the two second DMA channels is coupled to said second application buffer, said second network adapter card coupling said second external port and said at least two second DMA channels to allow concurrent data transfer; and
   wherein said first and second network adapter cards allow data transfer between the first diagnostic buffer and the second diagnostic buffer through the network fabric.

7. The network of claim 5, wherein said first network adapter card further comprises:
   a second external port connected to said network fabric;
   wherein said first network adapter card couples said second external port and said at least two DMA channels to allow concurrent data transfer;
   wherein a second DMA channel is coupled to said first diagnostic buffer; and
   wherein said first network adapter card can transfer data from said first diagnostic buffer to said network fabric through said first external port and back from said network fabric to said first diagnostic buffer through said second external port.

8. The network of claim 5, wherein said first network adapter card performs error monitoring on data transfers through said first external port.

9. The network of claim 5, wherein said first diagnostic buffer, said first network adapter card, said first DMA channel and said first external port are configured to allow transmission of diagnostic frames at an optimized line rate of said first network adapter card.

10. A method comprising:
    providing a host device having a memory containing a diagnostic buffer and at least one application buffer, and having a network adapter card coupled to said memory, said network adapter card including a first external port and at least two DMA channels, said at least two DMA channels capable of transmitting data in a same direction concurrently;
coupling a first DMA channel of the at least two DMA channels to said diagnostic buffer;
coupling at least one DMA channel to said application buffer; and
transferring data concurrently through said network adapter card by coupling said first external port and said at least two DMA channels.

11. The method of claim 10, further comprising:
providing a second external port on said network adapter card; and
transferring data concurrently through said network adapter card by coupling said second external port and said at least two DMA channels;
wherein a second DMA channel is coupled to said diagnostic buffer; and
wherein said network adapter card can transfer data concurrently from said diagnostic buffer through said first and second external ports and back to said diagnostic buffer.

12. The method of claim 10, further comprising performing error monitoring on data transfers through said first external port.

13. The method of claim 10, further comprising configuring said diagnostic buffer, said network adapter card, said first DMA channel and said first external port to allow transmission of diagnostic frames at an optimized line rate of said network adapter card.

14. A host device comprising:
a memory containing a diagnostic buffer and at least one application buffer; and
a network adapter card coupled to said memory, said network adapter card including a first external port and at least two DMA channels;
wherein a first DMA channel is coupled to said diagnostic buffer and at least one DMA channel is coupled to said application buffer, said network adapter card coupling said first external port and said at least two DMA channels to allow concurrent transfer of data in a same direction; and
wherein said diagnostic buffer, said network adapter card, said first DMA channel and said first external port are configured to allow transmission of diagnostic frames at an optimized line rate of said network adapter card.

15. The host device of claim 14, wherein said network adapter card further comprises:
a second external port;
wherein said network adapter card couples said second external port and said at least two DMA channels to allow transfer;
wherein a second DMA channel is coupled to said diagnostic buffer;
wherein said network adapter card can transfer data from said diagnostic buffer through said first and second external ports and back to said diagnostic buffer; and
wherein said diagnostic buffer, said network adapter card, said second DMA channel and said second external port are configured to allow transmission of diagnostic frames at an optimized line rate of said network adapter card.

16. The host device of claim 14, wherein said network adapter card performs error monitoring on data transfers through said first external port.

17. A network comprising:
a first device including a first memory and a first network adapter card coupled to said first memory, said first memory containing a first diagnostic buffer and at least one application buffer and said first network adapter card including a first external port and at least two DMA channels; and
a network fabric connected to said network adapter card through said first external port;
wherein a first DMA channel of the at least two DMA channels is coupled to said first diagnostic buffer and at least one DMA channel is coupled to said application buffer, said first network adapter card coupling said first external port and said at least two DMA channels to allow data transfer; and
wherein said first diagnostic buffer, said first network adapter card, said first DMA channel and said first external port are configured to allow transmission of diagnostic frames between said network fabric and said first diagnostic buffer at an optimized line rate of said first network adapter card.

18. The network of claim 17, further comprising:
a second device including a second memory containing a second diagnostic buffer and at least one second application buffer and a second network adapter card coupled to said second memory, said second network adapter card including a second external port and at least two second DMA channels;
wherein said second network adapter card is connected to said network fabric through said second external port;
wherein one DMA channel of the two second DMA channels is coupled to said second diagnostic buffer and at least one DMA channel of the two second DMA channels is coupled to said second application buffer, said second network adapter card coupling said second external port and said at least two second DMA channels to allow data transfer; and
wherein said first and second network adapter cards allow data transfer between the first diagnostic buffer and the second diagnostic buffer through the network fabric; and
wherein said second diagnostic buffer, said second network adapter card, said second DMA channels and said second external port are configured to allow transmission of diagnostic frames from said network fabric at an optimized line rate of said second network adapter card.

19. The network of claim 17, wherein said first network adapter card further comprises:
a second external port connected to said network fabric;
wherein said first network adapter card couples said second external port and said at least two DMA channels to allow data transfer;
wherein a second DMA channel is coupled to said first diagnostic buffer;
wherein said first network adapter card can transfer data from said first diagnostic buffer to said network fabric through said first external port and back from said network fabric to said first diagnostic buffer through said second external port; and
wherein said first diagnostic buffer, said first network adapter card, said first DMA channel and said second external port are configured to allow transmission of diagnostic frames between said network fabric and said first diagnostic buffer at an optimized line rate of said first network adapter card.

20. The network of claim 17, wherein said first network adapter card performs error monitoring on data transfers through said first external port.

21. The network of claim 17, wherein said at least two DMA channels are capable of operating concurrently.

22. A method comprising:
providing a host device having a memory containing a diagnostic buffer and at least one application buffer, and having a network adapter card coupled to said memory, said network adapter card including a first external port and at least two DMA channels;
coupling a first DMA channel of the at least two DMA channels to said diagnostic buffer;
coupling at least one DMA channel to said application buffer;
transferring data through said network adapter card by coupling said first external port and said at least two DMA channels; and
configuring said diagnostic buffer, said network adapter card, said first DMA channel and said first external port to allow transmission of diagnostic frames at an optimized line rate of said network adapter card.

23. The method of claim 22, further comprising:
providing a second external port on said network adapter card; and
transferring data through said network adapter card by coupling said first external port and said at least two DMA channels;
wherein a second DMA channel is coupled to said diagnostic buffer; and
wherein said network adapter card can transfer data from said diagnostic buffer through said first and second external ports and back to said diagnostic buffer.

24. The method of claim 22, further comprising performing error monitoring on data transfers through said first external port.

25. A host device comprising:
a memory containing a diagnostic buffer and at least one application buffer; and
a network adapter card coupled to said memory, said network adapter card including an external port;
wherein said diagnostic buffer, said network adapter card, said application buffer and said external port are configured to allow at least two concurrent data flows, wherein one of the at least two data flows comprises diagnostic data transfers and another one of the at least two data flows comprises normal data transfers, and wherein transmission of diagnostic data occurs at an optimized line rate of said network adapter card and transmission of normal data occurs at a reduced rate.

26. The host device of claim 25, wherein said network adapter card performs error monitoring on the diagnostic data transfers.

27. A method comprising:
providing a host device having a memory containing a diagnostic buffer and at least one application buffer, and having a network adapter card coupled to said memory, said network adapter card including an external port;
coupling said network adapter card to said diagnostic buffer;
coupling said network adapter card to said application buffer;
transferring data through said network adapter card by coupling said external port to said diagnostic buffer and said application buffer; and
configuring said diagnostic buffer, said network adapter card, said application buffer and said external port to allow at least two concurrent data flows, wherein one of the at least two data flows comprises diagnostic data transfers and another one of the at least two data flows comprises normal data transfers, and wherein transmission of diagnostic data occurs at an optimized line rate of said network adapter card and transmission of normal data occurs at a reduced rate.

28. The method of claim 27, further comprising performing error monitoring on the diagnostic data transfers through said external port.

* * * * *